United States Patent [19]

Deguchi et al.

[11] Patent Number: 4,636,928
[45] Date of Patent: Jan. 13, 1987

[54] INVERTER-DRIVE CONTROLLING APPARATUS

[75] Inventors: Takashi Deguchi; Masahiro Kadono; Shinji Naka, all of Kusatsu, Japan

[73] Assignee: Matsushita Electric Industrial Co., Ltd., Kadoma, Japan

[21] Appl. No.: 655,228

[22] Filed: Sep. 27, 1984

[30] Foreign Application Priority Data

Sep. 30, 1983 [JP] Japan .............................. 58-183382

[51] Int. Cl.$^4$ ...................... H02P 5/40; H02M 5/458
[52] U.S. Cl. ..................................... 363/41; 318/811; 363/42
[58] Field of Search ........................ 318/803, 807–811; 363/41, 42

[56] References Cited

U.S. PATENT DOCUMENTS 4,409,534 10/1983 Bose ..................................... 318/811
4,488,163 11/1984 Morinaga et al. ................... 318/811

OTHER PUBLICATIONS

B. G. Starr et al., LSI Circuit for AC Motor Speed Control, Electronic Components and Applications, vol. 2, No. 4, Aug. 1980, pp. 219-229.

Primary Examiner—David Smith, Jr.
Attorney, Agent, or Firm—Cushman, Darby & Cushman

[57] ABSTRACT

In an inverter-drive controlling apparatus in accordance with a simulated sinusoidal wave non-uniform PWM system, data of one carrier period comprises data region of integer number, and at least one HALT region, and the carrier period $T_0$ and data unit timer $T_2$ are produced by frequency division from a common reference oscillator, and the frequency divisions to obtain the carrier period $T_0$ and the data unit timer $T_2$ are controlled individually from each other, thereby output frequency to the inverter and output voltage thereto can be desirably controlled in digital process; thereby even utilizing limited area for storing sinusoidal wave data, accurately simulated sinusoidal waveform and good characteristic of the voltage-frequency is attainable and completely synchronized switching of plural waveform data regions are obtainable, thereby enabling adjusting of the revolution speed of electric motor in extremely wide range and up to a very high speed, and the waveform becomes very good.

9 Claims, 25 Drawing Figures

4,636,928

INVERTER-DRIVE CONTROLLING APPARATUS

BACKGROUND OF THE INVENTION

1. Field of the Invention

The present invention relates generally to an inverter-drive controlling apparatus, and particularly concerns an inverter-drive controlling apparatus which is especially suitable for drive-controlling operation of an induction motor of a relatively small output power for industrial use such as for the compressor of an air conditioner, refrigerator, or the like.

There are several known types of control apparatus for inverters to drive a motor, such as of PAM, or PWM type. Among them, PWM of inequal width simulated sinusoidal wave is superior in power source utility, miniaturization and light weight of apparatus, low noise of electromagnetic wave, low mechanical noise, vibration, etc., and its use has become a major trend in recent years.

The PWM of simulated sinusoidal wave is, as shown in FIG. 3 and FIG. 5, a system to produce a PWM algorithm in a manner to simulate the sinusoidal wave with an integral value of pulse voltage fed to a motor winding.

Now, a prior art HALT system, which is a basis to make the present invention, is elucidated as the prior art, with reference to FIG. 1, FIG. 2, FIG. 3, FIG. 4, FIG. 5, FIG. 6, FIG. 7, FIG. 8, FIG. 9, FIG. 10, FIG. 11 and FIG. 12. In FIG. 1, alternating current from a commercial power source E is rectified and smoothed by a reactifier-smoother 1, and the rectified and smoothed DC output from the rectifier-smoother 1 is given to an inverter. The output of the inverter 2 is fed to an electric motor 3, and an inverter drive controlling circuit 4 provides the inverter 2 with a controlling signal.

Next, one example of the general inverter system configured for an air conditioner is shown in FIG. 2.

In FIG. 2, numerals 1, 2, 3 and 4 designate the rectifier smoother 1, inverter 2, electric motor 3 and inverter drive controlling circuit 4 of FIG. 1, respectively. The inverter drive controlling circuit comprises a PWM algorithm generator 4a and a base current driver for supplying base currents to the bases of transistors $Tr_1$, $Tr_2$, $Tr_3$, $Tr_4$, $Tr_5$, and $Tr_6$ in the inverter 2 and a photocoupler 4b which couples the PWM algorithm generator 4a and the base current driver 4c in insulated manner.

Signals generated by the PWM algorithm generator 4a are amplified and conveyed by the photo-coupler 4b to the base current driver 4c, and after current amplification the signals are routed to the inverter 2. In the inverter 2, the transistor pairs $Tr_1$ and $Tr_2$, $Tr_3$ and $Tr_4$, and $Tr_5$ and $Tr_6$ each constitute inverter switches, and one of each transistor in the pair is selectively turned on any time. Junction points between the transistor pairs are connected to three terminals U, V and W of the electric motor 3 of a compressor of an air conditioner.

FIG. 3 shows wave forms of signals to be applied to the bases of the transistors $Tr_1$ through $Tr_6$, and waveforms of voltages to be applied across the windings of electric motor 3. In FIG. 3, waveforms U, V and W correspond to the signals applied to the bases of the transistors $Tr_1$, $Tr_3$ and $Tr_5$. U—V, V—W and W—U are waveforms of voltages applied to respective windings of the electric motor 3.

As shown in FIG. 3, the waveforms of the voltages are designed to simulate a sinusoidal wave when integrated, and a period of the pattern of this voltage determines the revolution of the electric motor 3.

Now, PWM algorithm is elucidated with reference to FIG. 4 which elucidates the concept of the carrier. A half period of the sinusoidal wave of FIG. 4 is equally divided by an integer N into N consecutive time periods. This integer N is called the carrier, and the small period $T_0$ made by dividing the half period of the sinusoidal wave by the carrier N is called the carrier period. By issuing pulses in respective periods $T_0$, with each having pulse widths proportional to a voltage which exists at that particular divided period $T_0$ of the sinusoidal wave, the algorithm as shown by FIG. 3 is produced.

Nextly, the voltage value to be applied to the coils of the electric motor 3 is elucidated with reference to FIGS. 5(a) and (b). As shown by FIG. 5(a), it is provided that pulses of a predetermined voltage and having pulse widths corresponding to a sinusoidal wave having a value of an integral of the pulses are generated by means of an algorithm. When the pulse widths of the pulses are increased in a proportional way, the waveforms become as shown in FIG. 5(b). Namely, the value of the integral of the pulses increases. Accordingly, the amplitude of the sinusoidal wave can be controlled by changing the pulse widths.

Nextly, the relation between the pulse widths which defines the output voltage (amplitude of the sinusoidal wave) and HALT is elucidated with reference to FIG. 6(a) and FIG. 6(b). FIG. 6(a) shows a situation wherein the carrier period $T_0$ (1) comprises plurally divided times: ome region of data, and a HALT region being defined as the remaining time in the carrier period $T_0$ such as $T_{0(1)}$. By definition, in this HALT region, no voltage data is output. In this first case, shown in FIG. 6(a), the time period of the data region is much smaller in comparison with the carrier period $T_0(1)$.

In a second case, as shown in FIG. 6(b), the carrier period $T_0(1)$ is halved. Thus, in the time occupied by one $T_0(1)$ period, two periods of duration $T_0(2)$ are produced, and the time period of the data region is unchanged. Then, frequency f of the carrier becomes doubled (since carrier period $T_0(2) = \frac{1}{2} \cdot T_0(1)$), and the output voltage is also doubled. The is because the relative pulse widths with respect to the carrier period $T_0(2)$ are double the pulse widths with respect to the carrier period $T_0(1)$.

A small time unit is defined by dividing the time period of the data region DATA of FIG. 6(a) and FIG. 6(b) by an integer K; this time unit is named the "data unit timer $T_2$. Then, by fixing the data period or data unit timer $T_2$ to a constant length and changing the carrier period $T_0$, the frequency f is changed in an inverse proportion thereto, and output voltage is changed in proportion to the frequency. The HALT period, which is the period when no data is produced, also changes as in the example of FIGS. 6(a) and 6(b).

The above-mentioned frequency-output voltage relation is shown in FIG. 7.

Now, a further detailed description is made with respect to the data region, with reference to FIG. 8(a) and FIG. 8(b).

In these time charts, a sampled voltage during this period is represented by a number of the unit timers $T_2$ periods. This number of periods corresponds to the value of the sampled voltage. Therefore, the voltage is represented by a logic pattern having K resolution.

When the carrier N and the integer K are selected as larger numbers, the waveform of the voltage to be applied to the electric motor more smoothly simulates a sinusoidal wave, with a real sinusoid being approached as N and K approach infinity.

As shown in FIG. 8(*a*) and FIG. 8(*b*), both cases have the same carrier period $T_0(1)$, but the data unit timer $T_2(1)$ of FIG. 8(*a*) is only half the length of time of the data unit timer $T_2(2)$ of FIG. 8(*b*). Accordingly, the data region time length $T_2(2) \times K$ of FIG. 8(*b*) is 2-times of the data unit timer $T_2(1) \times K$ of FIG. 8(*a*), and HALT time of FIG. 8(*b*) accordingly becomes smaller than the HALT time of FIG. 8(*a*). In these cases, the output voltage of FIG. 8(*b*) is 2-times the output voltage of FIG. 8(*a*). Accordingly, the frequency-voltage graph of FIG. 9 plotted with the data unit timers $T_2(1)$ and $T_2(2)$ as parameters, becomes as shown in FIG. 9.

For a certain frequency, for instance, represented by a vertical line in FIG. 9, when voltage amplitude goes up, the parameter changes from $T_2(1)$ to $T_2(2)$ and so on, and the HALT region decreases; until at extremity, the HALT region vanishes. For a certain rectified and smoothed DC voltage from the rectifier smoother 1, a maximum voltage which can be impressed on the electrical motor 3 is determined by this condition. Accordingly, even though the frequency is increased further from that condition, the voltage to be impressed on the electric motor 3 does not change further. The above-mentioned situation is elucidated with reference to FIG. 10(*a*) and FIG. 10(*b*).

As shown in FIG. 10(*a*), a carrier period $T_0(3)$ is equally divided by an integer number K thereby defining the data unit timer $T_2(1) = 1/K \cdot T_0(3)$, without retaining the HALT region at all. That is, the relation $T_0(3) = K \times T_2(1)$ holds. Then, if the frequency f is raised so as to have a shorter carrier period $T_0(4)$ shown in FIG. 10(*b*) than a previous carrier period $T_0(3)$, the data unit timer $T_2(3)$ is given by an equation $T_0(4) = K \times T_2(3)$. As the frequency change, ratios of data region period against carrier period $T_0$ are kept constant, and accordingly the voltage obtained from the both cases are equal to each other as shown by FIG. 11.

Nextly, relation between the inverter output and load is elucidated. When the load is a resistive load, the inverter output is proportional to square of voltage. On the other hand, with respect to a compressor of an air for instance, amount of work is proportional to the exhaustion volume of refrigerant from cylinders of the compressor. Accordingly, the exhaustion volume is proportional to the number of revolutions of the electric motor. Accordingly, it is preferable that frequency f and the output voltage should have a predetermined proportional relationship.

However, an actual electric motor for the compressor shows effect of iron loss and copper loss, etc., and therefore, in a low frequency range it is necessary that its driving voltage should be increased in order to compensate these above-mentioned iron loss, copper loss, etc. That is, boost function is necessary.

In the prior art apparatus, the boosted curve was realized by adding corrections. This is accomplished by obtaining the carrier period $T_0$ and data unit timer $T_2$ by analog timer circuits. Then the carrier frequency is set by means of the carrier period $T_0$, and the compensation is added to the unit timer $T_2$ responding to the set value of the carrier period $T_0$. The greatest advantage of the HALT system is that by only changing the carrier period $T_0$ and data unit timer $T_2$, the PWM algorithm can be obtained for any frequency regions by providing only one period of algorithm generation pattern.

The above-mentioned prior art apparatus has the advantage that, when the circuit used to produce the carrier period $T_0$ and the data unit timer $T_2$ are realized by analog timers, and minute variations of the timer value can be made by adjusting circuit components of the external circuit. Thus, the carrier period $T_0$ and the data unit timer $T_2$ can be adjusted independently of each other. But the prior art has a problem that when frequencies to be used are widely distributed and when close simulation to the sinusoidal wave is desired, there is a necessity that the carrier N and the integer K (number of data) should be altered for different conditions. That is, in a low frequency range where resolution of the sinusoidal wave becomes rough and simulation of the sinusoidal wave becomes difficult, it is necessary that the carrier N and the integer K must be selected large. And on the other hand, when the carrier N and the integer K are large in a range of high frequency of f, switching speed of the transistors $Tr_1$ through $Tr_6$ becomes a great problem. That is, due to limit of the switching speed of the transistors $Tr_1$ through $Tr_6$, the OFF-times of the transistors occupy a high ratio in the operation, and therefore the output voltage becomes low. Accordingly, the carrier N and the integer K must be limited to a reasonably small number.

In the prior art analog timer system, though PWM generation data itself relating to change of the carrier N and data number K can be made by an external data area such as ROM or the like, smooth switchings between two kinds or more analog timers is difficult in view of transiential phenomena. For instance, in case that such switching is made by changing the carrier period $T_0$ and data unit timer $T_2$ with even a small difference, target frequency or target voltage happens suddenly to change even at a short instance, and therefore the compressor may have an overcurrent or locking or at some instance, the power transistors will be damaged.

SUMMARY OF THE INVENTION

The purpose of the present invention is to provide an inverter-drive controlling apparatus wherein the shortcoming of the prior art is eliminated and a more closely simulated sinusoidal wave as integral of PWM waves is obtainable.

According to the present invention the HALT system of obtaining simulated sinusoidal wave by PWM is improved, wherein carrier period $T_0$ and data unit timer $T_2$ are obtained by individually dividing frequency from a common reference oscillator, wherein the carrier period $T_0$ and the data unit timer $T_2$ are individually controlled to produce desired frequency and voltage for an electric motor thereby to produce desired voltage-frequency characteristic. Accordingly, by utilizing the same, i.e., single PWM data pattern, while range of voltage-frequency characteristics are realizable.

Furthermore, by realizing completely synchronized switching of the carrier period $T_0$ and the data unit timer $T_2$, stable and safe switching of the carrier and PWM data pattern becomes possible. Besides the poor resolution of the sinusoidal wave in the low frequency region in the prior art, can be smartly solved by providing plural PWM data patterns, and thereby, accurately simulated sinusoidal wave is obtainable by using PWM data pattern with increased number of data in the low frequency range.

By completely synchronizing the above-mentioned carrier period $T_0$ and data unit timer $T_2$ with a switching signal for switching the carrier and data number, both of the carrier period $T_0$ and the data unit timer $T_2$ are independently controllable from the other.

As a result, an output signal of more closely simulated sinusoidal wave than the prior art for wider range of output frequency are obtainable.

The inverter-drive controlling apparatus of the present invention comprises a ROM for memorizing a carrier number, data number and data contents, a frequency determining means for determining a carrier period of one period of an output wave on the basis of the carrier number memorized in the ROM, a first timer means for outputting the carrier period determined by the frequency determining means, a voltage determining means for determining a voltage corresponding to a predetermined frequency-to-voltage characteristics responding to the carrier period determined by the frequency determining means, a region determining means for determining a ratio of a data region and a HALT region in the carrier period, to obtain the voltage determined by the voltage determining means, a second timer means for outputting a data unit timer in the data region determined by the region determining means, a waveform data processing means for supplying said memorized data contents in a predetermined order to the data region predetermined by the region determining means, every each data unit timer determined by the second timer means, and a HALT region processing means for comparing the end of the carrier period outputted by the first timer means with the end of the data unit timer outputted by the second timer means and outputs the HALT region to the waveform data processing means when the end of the data unit timer is faster than that of the carrier period.

DESCRIPTION OF THE PREFERRED EMBODIMENT

Hereafter, a preferred embodiment in accordance with the present invention is described with reference to FIG. 13 and thereafter.

Figure 13:
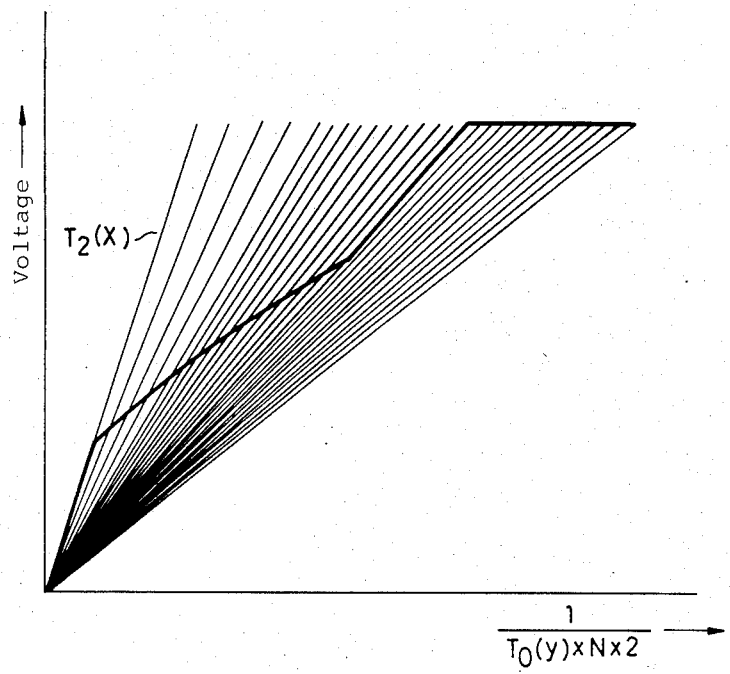
FIG. 13 is a graph showing voltage-frequency characteristic of an embodiment of inverter-drive controlling apparatus in accordance with the present invention wherein voltage boosting is realized.

FIG. 13 is a voltage-frequency characteristic diagram illustrating boosting of the low frequency range in accordance with the present invention.

As has been elucidated with respect to the prior art, the voltage-frequency gradient is determined by the data unit timer $T_2$, and the frequency f is determined by the carrier period $T_0$. Therefore, by plotting crossing points of the boosted voltage curves for respective frequencies and oblique lines of the parameter of the data unit timer $T_2(x)$, data can be issued as combinations of $(T_0, T_2)$.

Figure 14:
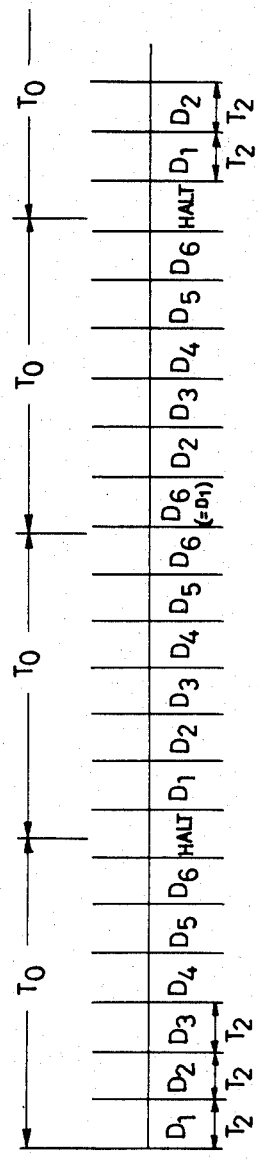
FIG. 14 is a schematic timing chart showing data regions wherein digital processings are adopted.

FIG. 14 illustrates digital processing when the HALT region is short. Here, it is provided that data number K is 6 and the data are now named $D_1$, $D_2$, $D_3$, $D_4$, $D_5$ and $D_6$. Data unit timer is defined as $T_2$ and the carrier period is defined as $T_0$.

(i) In the case where the HALT period is longer than carrier period $T_0$, after issuing the HALT, another signal of carrier period $T_0$ is waited for and the next data $D_1$ is issued in synchronism with the next carrier period $T_0$.

(ii)
In the case when the HALT time period is shorter than the data unit timer $T_2$, the HALT is issued only for a period of the data unit timer $T_2$, as shown at the boundary between the first carrier period $T_0$ and the second carrier period in FIG. 14. Thereafter, the data $D_1$ through $D_6$ are issued subsequently. At this time, output time periods for issuing the data $D_1$ through $D_6$ each are the data unit timers $T_2$ as such. However in this case, when the end of the carrier period $T_0$ comes during outputting of the data 6, the next HALT is not issued, but the data $D_6$ is continued to be issued for the remaining data unit timer $T_2$. During this time, an address of PWM pattern data is changed by adding 2 (i.e., $+2$) for the next time. That is, in the next carrier period $T_0$ the data $D_1$ is omitted, and the $D_2$ is accessed immediately after the doubled $D_6$, as shown in a second to third carrier period boundary.

Here, the PWM pattern data is preliminarily determined in a manner that the data $D_6$ and the next data $D_1$, which are adjacent with the HALT in between, are to be the same logic value. By so designing, the second output data $D_6$, for instance, is the same as that of the next data $D_1$, so the sequence of the data becomes as if the HALT region is distinguished and the data are issued in continuity.

When the frequency further increases, the HALT period is equal to the unit timer $T_2$, but the probability of appearance of HALT itself decreases in total period and output voltage increases.

Figure 1:
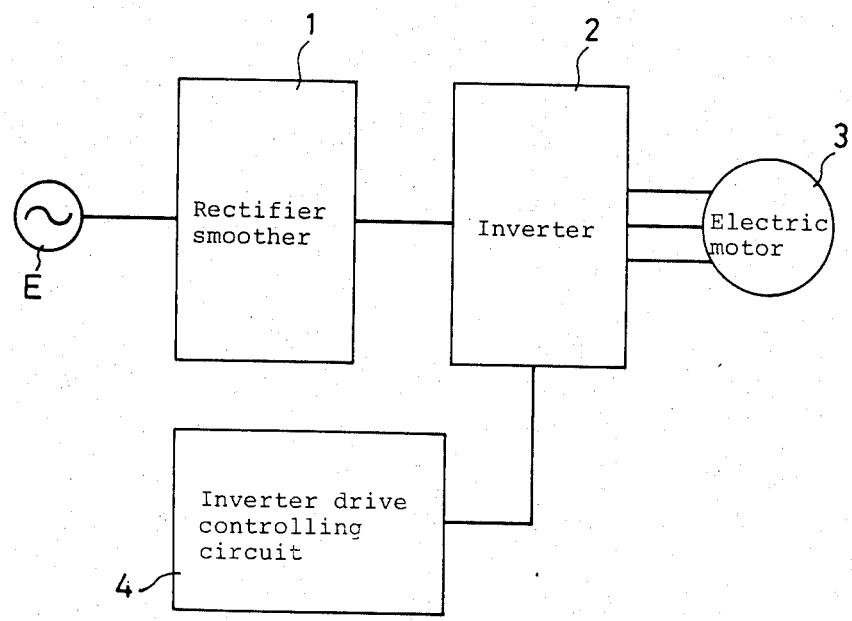
FIG. 1 is the block diagram of the general prior art inverter system.
Figure 2:
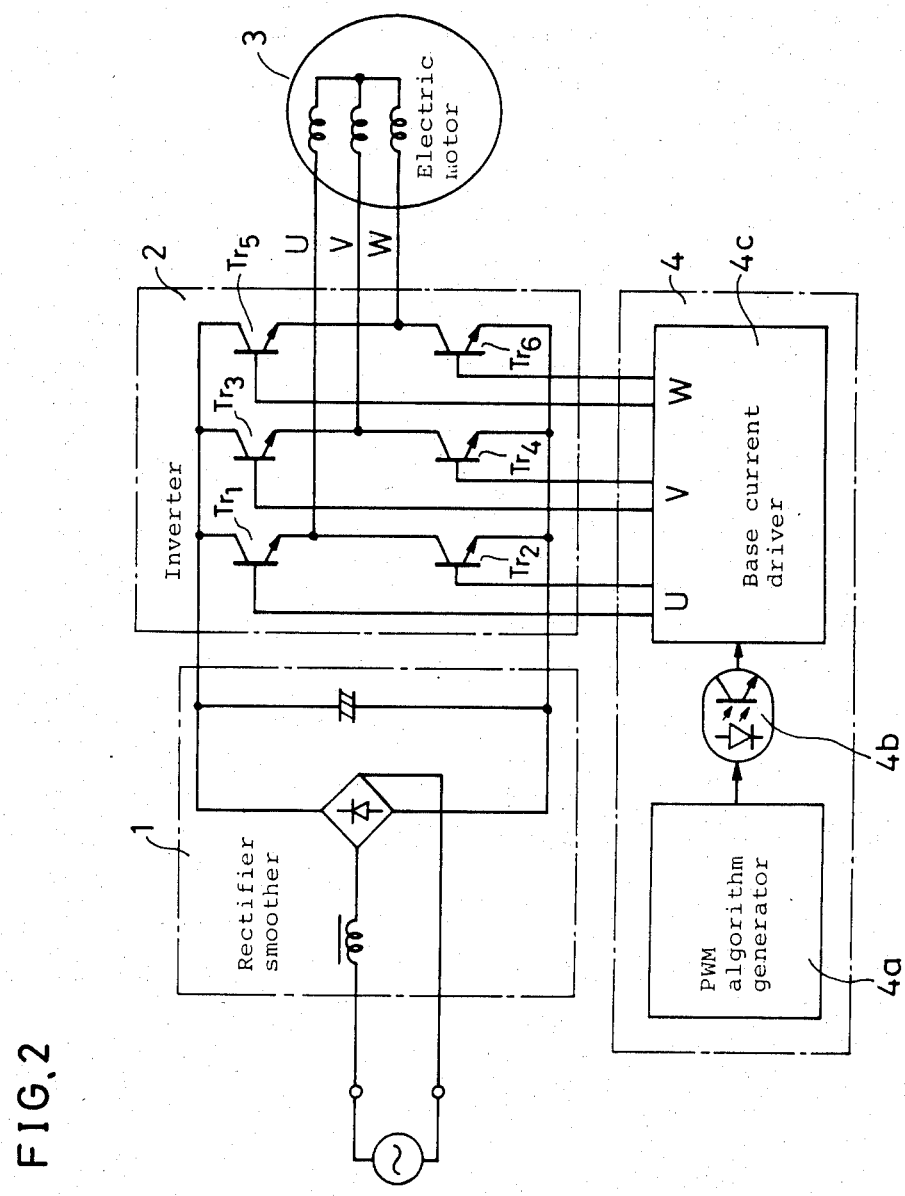
FIG. 2 is the more detailed block diagram of the prior art apparatus of FIG. 1.
Figure 3:
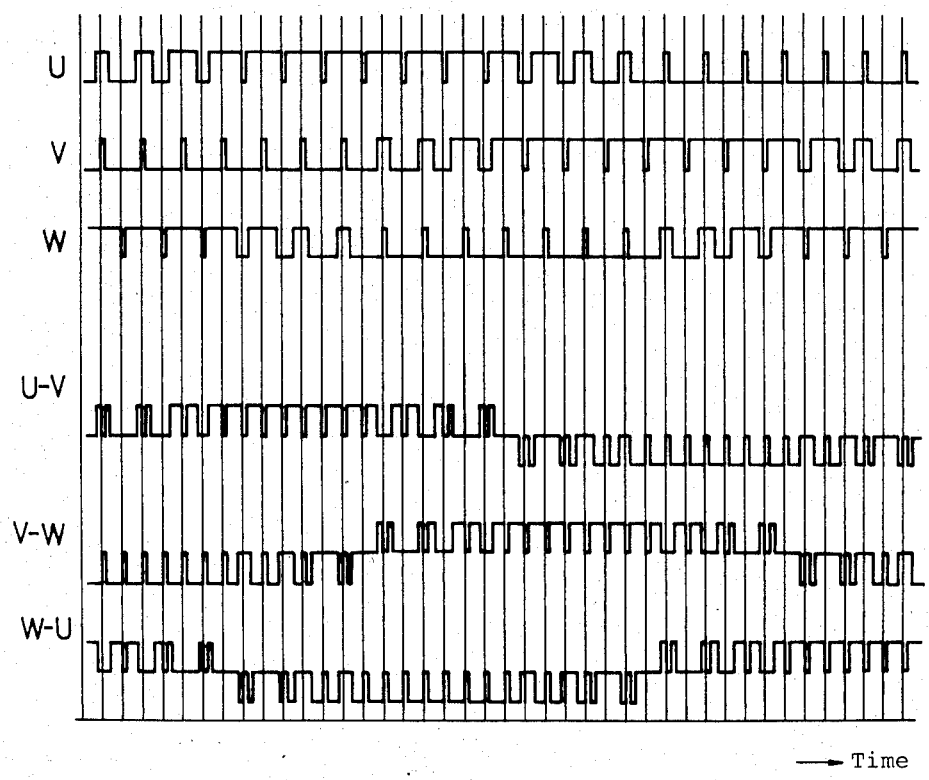
FIG. 3 is the time chart showing voltage waveforms to be applied the electric motor 3 of the prior art apparatus of FIG. 1.
Figure 4:
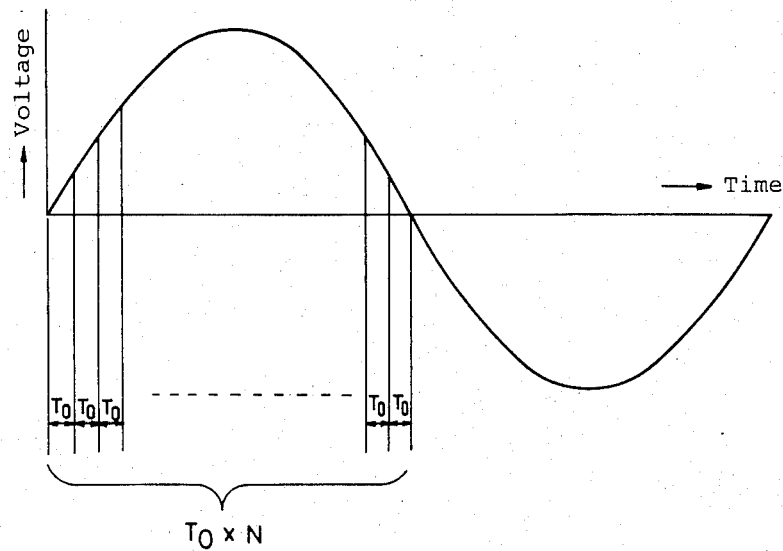
FIG. 4 is the graph illustrating the carrier of the inverter system of FIG. 1.
Figure 5A:
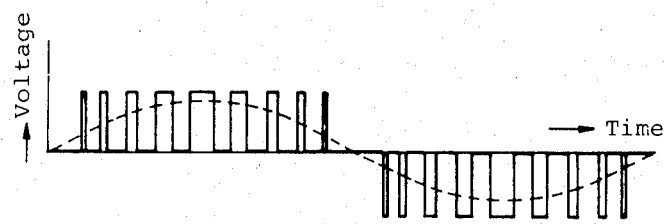
FIG. 5(a) and FIG. 5(b) are graphs illustrating voltages applied to the electric motor 3 of the inverter of FIG. 1.
Figure 5B:
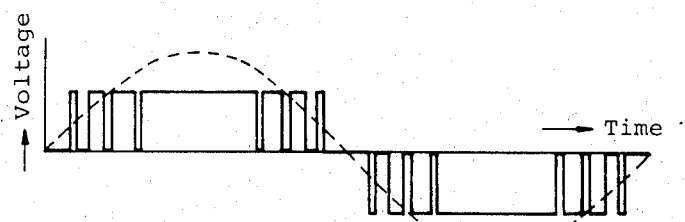
Figure 6A:
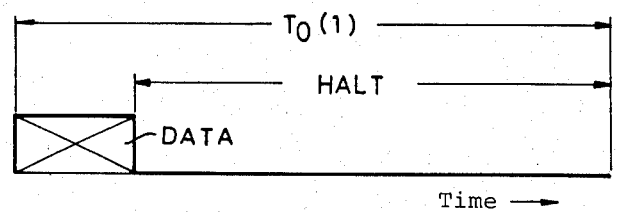
FIG. 6(a) and FIG. 6(b) are time charts illustrating HALT period and the period in the carrier period $T_0$.
Figure 6B:
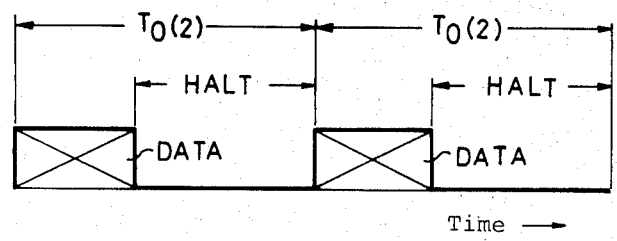
Figure 7:
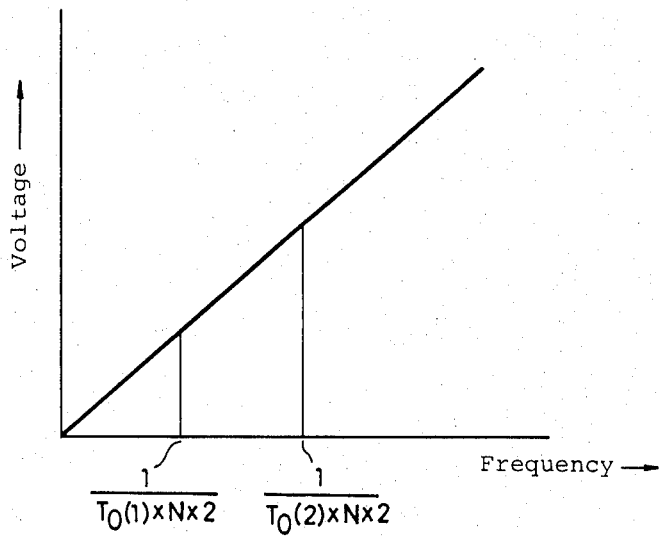
FIG. 7 is the graph showing voltage-frequency relation of the inverter of FIG. 1.
Figure 8A:
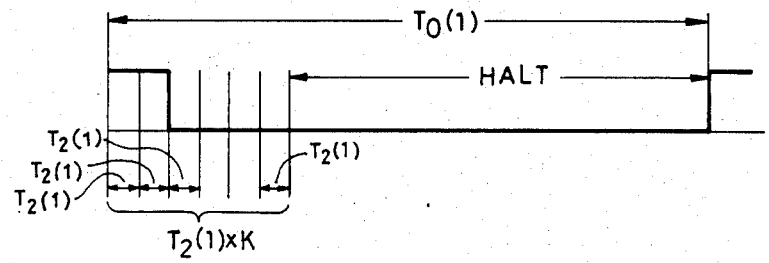
FIG. 8(a) and FIG. 8(b) are time charts showing data timer $T_2$ and HALT period in the carrier period $T_0(1)$ in the prior art apparatus of FIG. 1.
Figure 8B:
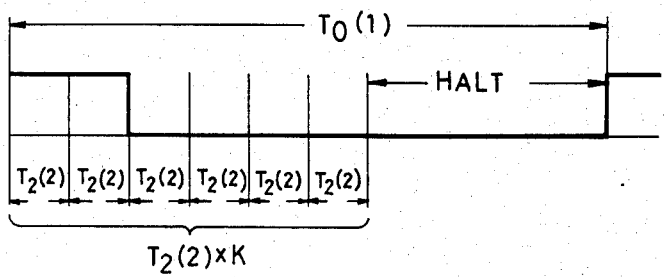
Figure 9:
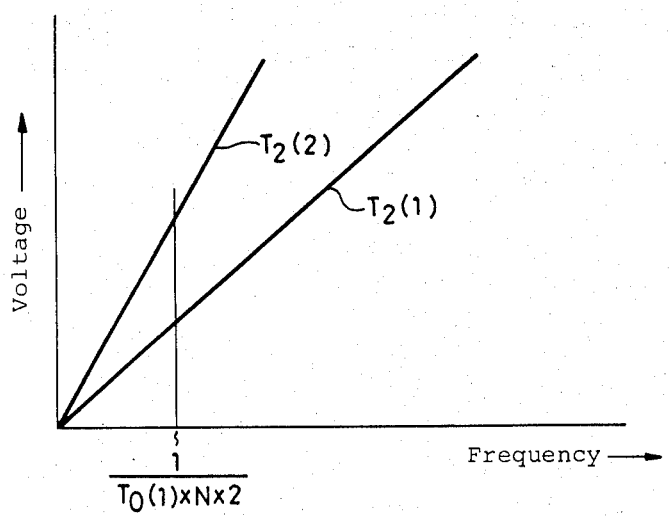
FIG. 9 is the graph showing voltage-frequency relation of the apparatus of FIG. 1 taking the unit timer $T_2$ as parameter.
Figure 10:
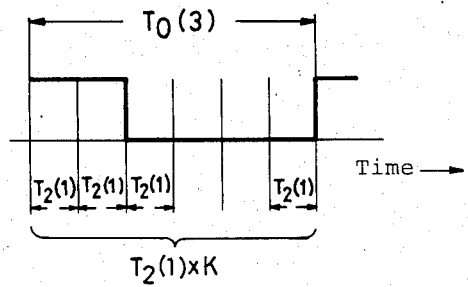
FIG. 10(a) and FIG. 10(b) are time charts showing data regions in the carrier period $T_0$ of the prior art apparatus of FIG. 1.
Figure 10:
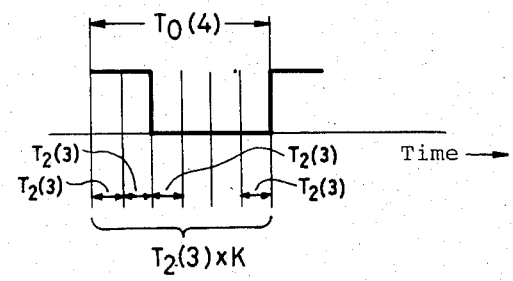
Figure 11:
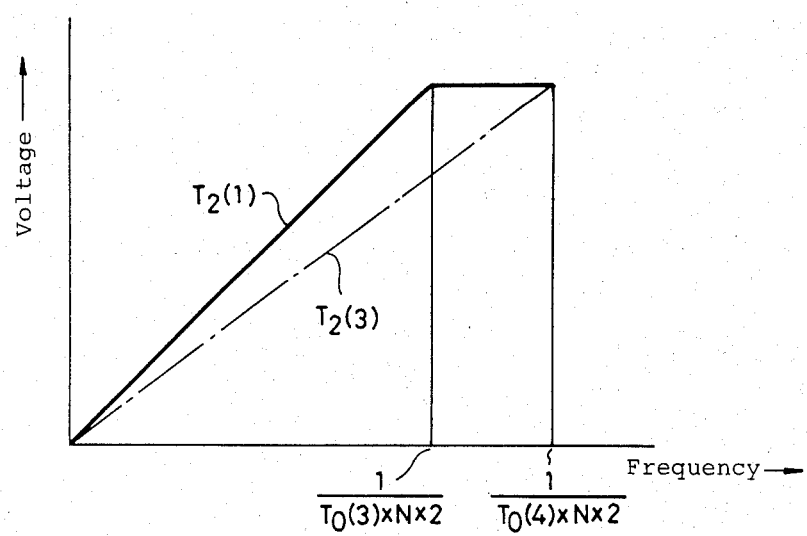
FIG. 11 is a graph showing voltage-frequency relation of the prior art apparatus of FIG. 1.
Figure 12:
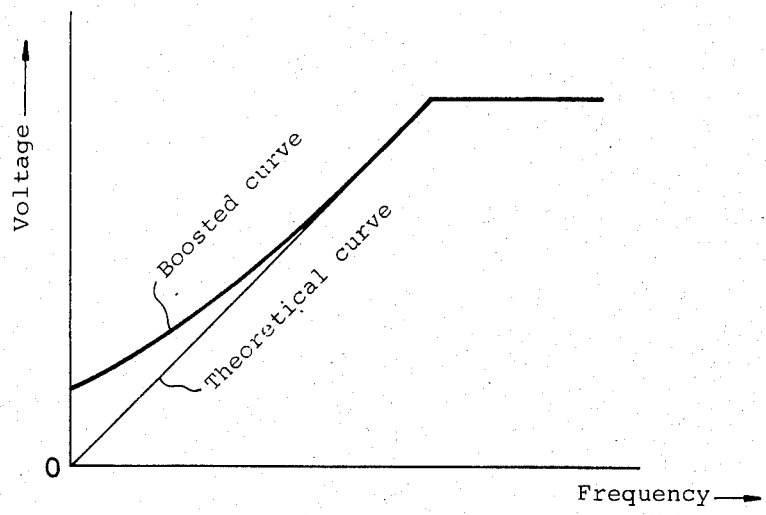
FIG. 12 is the graph showing voltage-frequency required for the low frequency region operation of the prior art of FIG. 1.

Finally, (iii) when the voltage reaches the upper limit, the HALT period completely disappears, thereby holding $T_0=6T_2$. This is the case which has been elucidated with reference to FIG. 10(a) and FIG. 10(b).

In order to further raise the frequency, the carrier period $T_0$ is shortened while keeping the above-mentioned relation of $T_0=6T_2$.

The outline of the digital processing has been elucidated as above.

Figure 15:
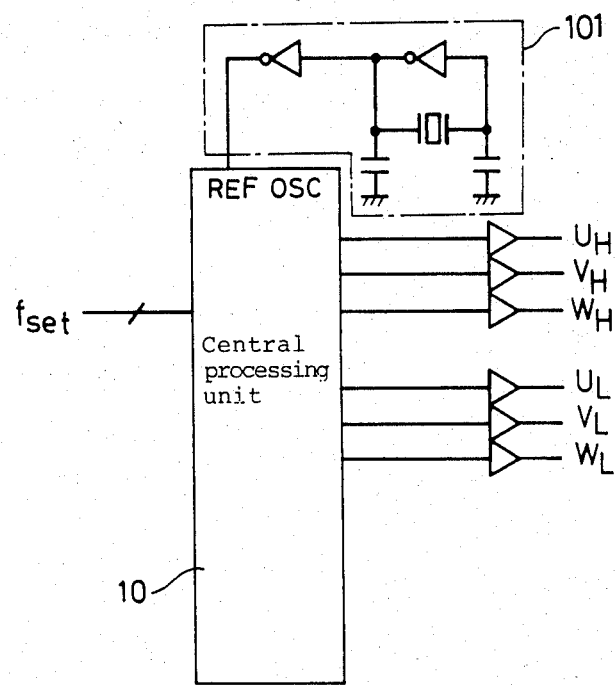
FIG. 15 is a block diagram of one example of inverter-drive controlling apparatus in accordance with the present invention.

Nextly, an actual embodiment in accordance with the present invention is elucidated with reference to FIG. 15 and thereafter. FIG. 15 is a circuit diagram utilizing a microcomputer 10, wherein the microcomputer comprises input terminal REF OSC to receive a reference oscillation frequency from a reference oscillator 101. The input reference oscillation frequency is divided in the microcomputer to produce the carrier period $T_0$ and data unit timer $T_2$. In order to drive a compressor motor, a means to gradually change frequency towards a target frequency, and a timer to gradually change the frequency is constituted, for instance by using a commercial power source frequency. An input signal $f_{set}$ is an input to provide a target frequency, and the frequency is gradually changed to the frequency set by the $f_{set}$ signal.

Figure 16:
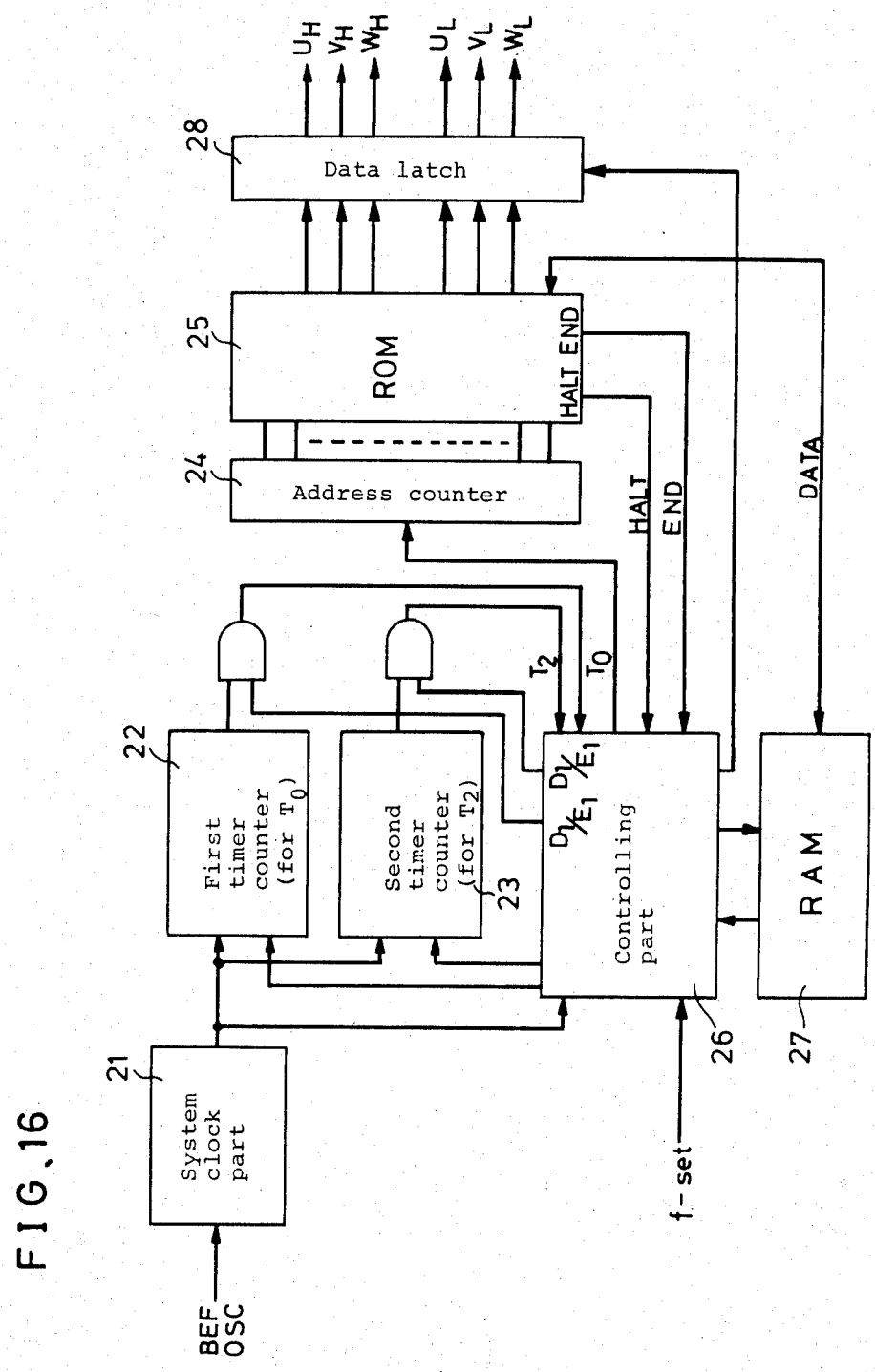
FIG. 16 is a detail block diagram of an actual embodiment of the apparatus embodying the present invention.

FIG. 16 shows a more detailed circuit configuration of the embodiment comprising a digital processing means and memory means. In FIG. 16, a system clock part 21 divides the reference oscillation signal to produce a system clock output period. The system clock part 21 issues a system clock signal which is used in executing a program and also to produce the carrier period $T_0$ and the data unit timer $T_2$. The output of the system clock part 21 is routed to a first timer counter 22 for producing a carrier period $T_0$ by frequency-dividing of the system clock signal and to a second timer counter 23 which also producing the data unit timer $T_2$ by frequency dividing the system clock output. The frequency dividing ratios for producing the carrier period $T_0$ and the data unit timer $T_2$ are determined by the control part 26. Controlling of the start of the data unit timer $T_2$ is also performed by the control part 26. The carrier period $T_0$ and the data unit timer $T_2$ are input to the control part 26 respectively by interruptions and sequential access to ROM 25. ROM 25 stores PWM data, and is accessed through address counter 24. Therefore, information is output through data latch 28 as designated by the control part 26, which issues data for U, V, W phases in sequence. The above-mentioned ROM 25 stores any other necessary data for the program and transfers this data through address counter 24 to RAM 27 corresponding to control signals from the control part 26 when necessary. The frequency divided values of the carrier period $T_0$ and the data unit timer $T_2$ are stored in the ROM 25 for respective frequencies, and these values are transferred from the ROM 25 to RAM 27 by means of control part 26 and the address counter 24, and set in the first timer counter 22 and the second timer counter 23. The setting of the frequency f as target is also done by the control part 26.

Functions necessary for system control, for instance known freezing cycle processing or intercommunication processing between indoor unit, and outdoor units of separate type air conditioners, processings of four-side valves, fan motors, current controls, defrosting controls, etc. are also processed by the control part 26, and these are processed by time sharing interruption during the controlings of the carrier period $T_0$ and data unit timer $T_2$.

Figure 17:
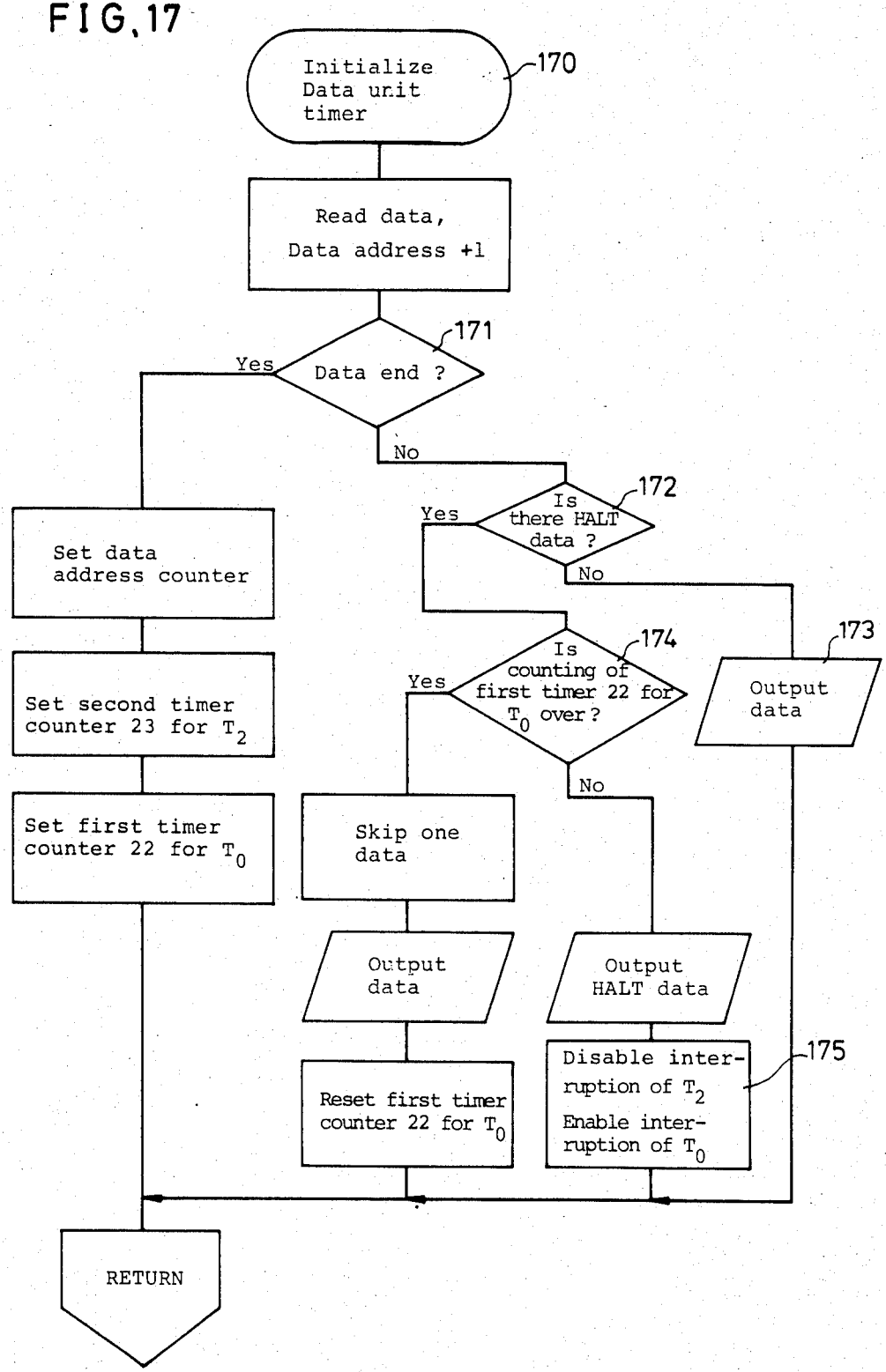
FIG. 17 is a flow chart showing processing of the data unit timer $T_2$.
Figure 18:
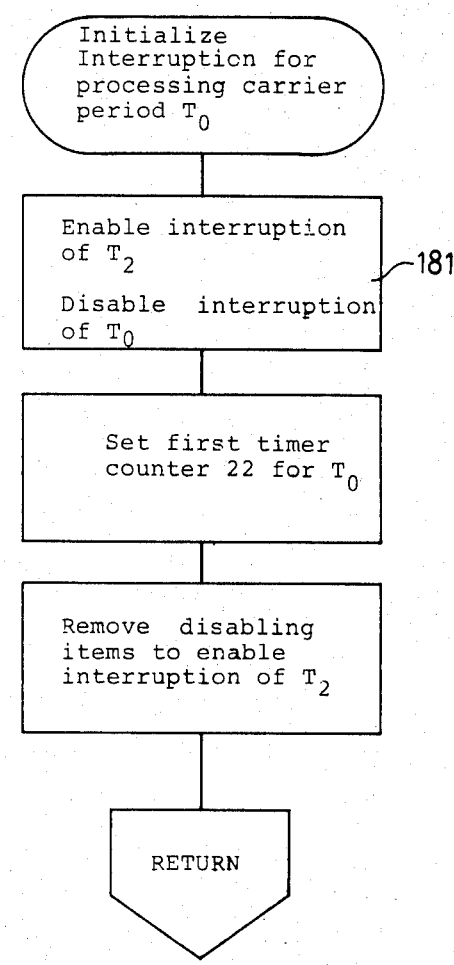
FIG. 18 is a flow chart showing processing of the carrier period $T_0$ in the apparatus of the embodiment.
Figure 19:
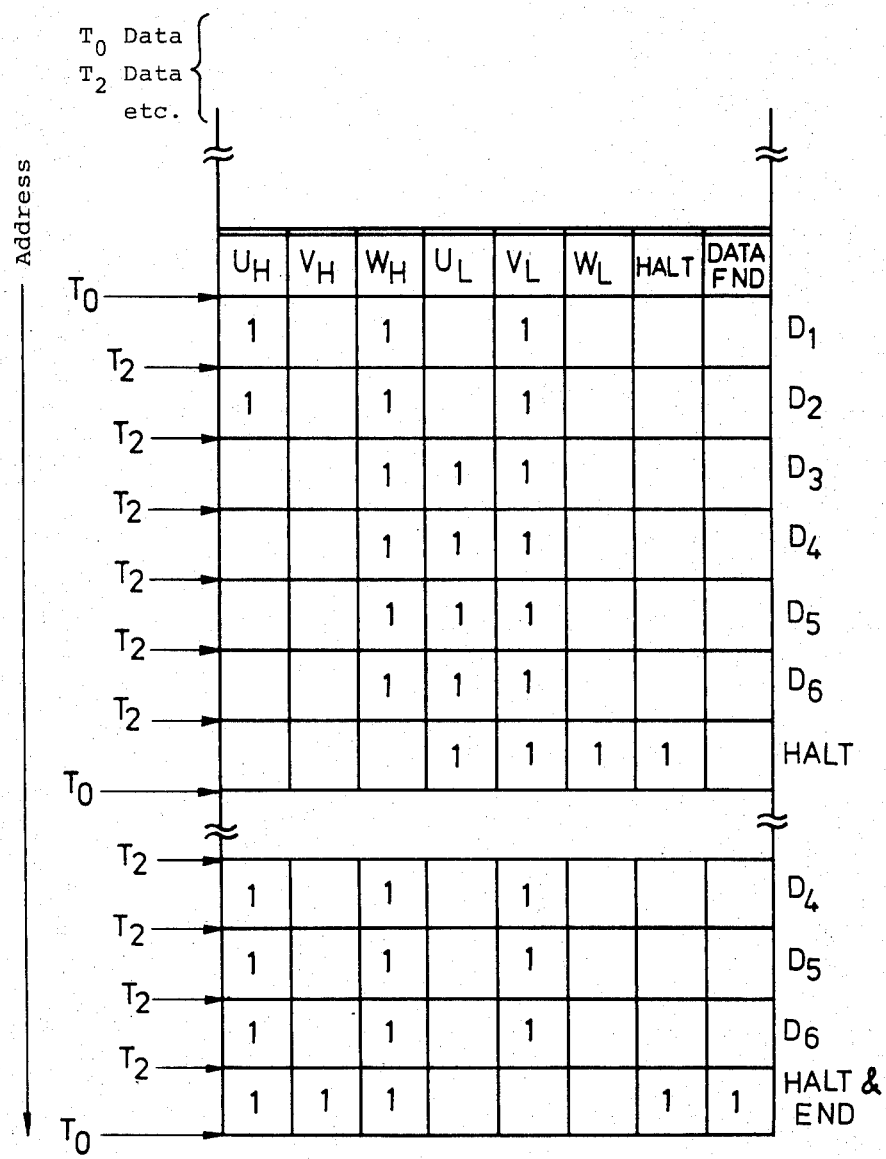
FIG. 19 is a diagram showing PWM data area in a ROM in the apparatus of the embodiment.
Figure 20:
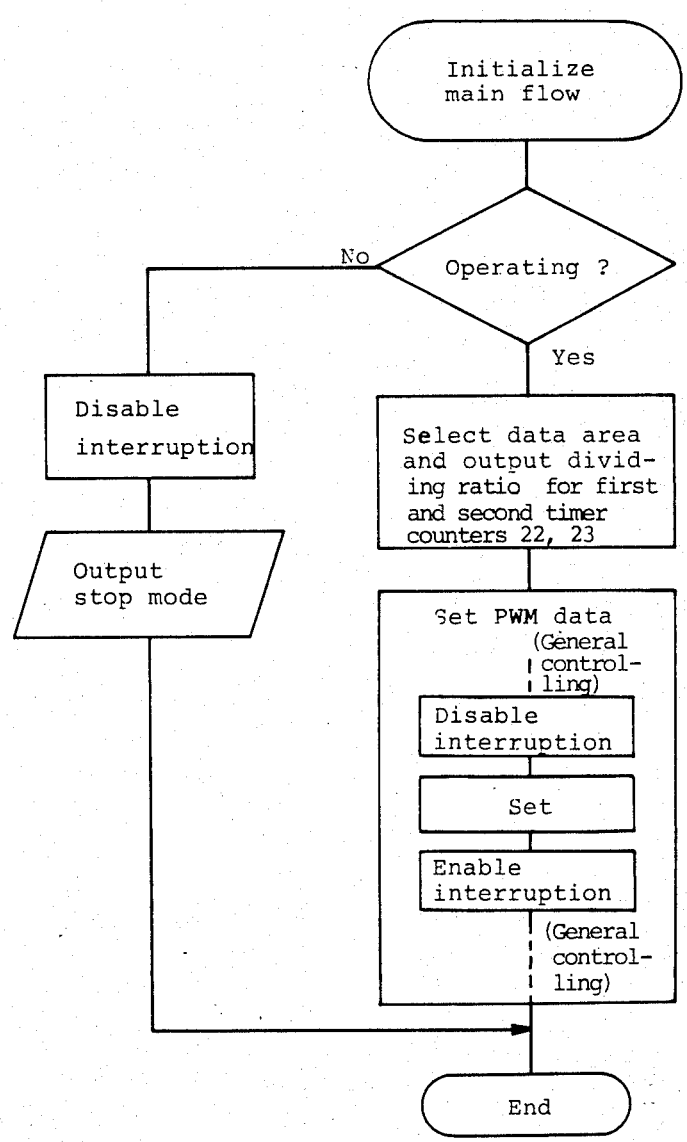
FIG. 20 is a flow chart showing main flow chart of the apparatus of the embodiment.

Flow charts for realizing the above-mentioned embodiment is shown in FIG. 17, FIG. 18 and FIG. 20. FIG. 17 is a flow chart for the interruption processing for the data unit timer $T_2$. FIG. 18 is a flow chart or the interruption processing for the carrier period $T_0$ and the data unit timer $T_2$ are used as interruption input capable of masking. FIG. 19 shows one example of an area chart of PWM data area in the ROM 25, and in PWM data area therein, a waveform of PWM simulating the sinusoidal wave being stored in one sequence for one cycle, and 8 bits of the PWM data area are alloted to $U_H$, $V_H$, $W_H$, $U_L$, $V_L$ and $W_L$ data and HALT data to show HALT period and a data of "DATAEND" to show the end of one period of one data.

Timings of the actual waveform are shown in FIG. 14 which shows one output of U, V and W phases as a representative signal. FIG. 20 is a main flow chart of the whole system. When starting the operation, firstly initializing processing of the system chart is carried out and initial values of the carrier period $A_0$ and data unit timer $T_2$ are set. Since the carrier period $T_0$ and the data unit timer $T_2$ are hardware timers, they start operation at this point. Nextly, interruption of the data unit timer $T_2$ as shown in the flow of FIG. 17 is enabled, and subsequently the operation entered into the general controlling.

Firstly as shown in FIG. 20, an initial value of the data unit timer $T_2$ is set, and the ROM address is set at the beginning of the PWM data.

Nextly, judging of the data end is carried out at the stage 171 of FIG. 17. Since the data end does not come in the initial stage, the process goes to the HALT judging in the stage 172 of FIG. 17. Since the HALT data does not exist in the initial stage, the data is output at the stage 173. Nextly a second data is read in, a similar processes are carried out. In such repetition, the data are output in turn. The data are output until $D_6$, when the HALT judging stage 172 goes to the YES side. At this time, the next carrier period $A_0$ is judged. When the carrier period $T_0$ is not input, the HALT data is issued and interruption of the data unit timer $T_2$ is disabled and interruption of the carrier period $T_0$ is enabled, and it comes to a state where the carrier period $T_0$ is waiting for the data unit timer $T_2$.

Nextly when the carrier period $T_0$ comes, the processing advances to the flow chart of the process of the carrier period $T_0$ in FIG. 18, wherein when the carrier period $T_0$ is received as the interruption input to the flow chart of FIG. 18, the second timer counter 23 is enabled and the first timer counter 22 is disabled in the stage 181. Then, the apparatus waits for a completion of counting of the second timer counter 23, and upon the completion of the counting, the processing again returns to the beginning stage 170 of the flow chart of FIG. 17.

When a next data unit timer $T_2$ comes, the data address becoms +1 state, and the data is selected in the stage 173 of FIG. 17 and issued, since it is not the data end stage nor HALT state.

In the above-mentioned way, data for each period of the sinusoidal wave are output in sequence, and by the values of carrier period $T_0$ and data unit timer $T_2$, the frequency f and the output voltage V of the signal to be applied to the electric motor is determined and desired PWM pattern is produced.

When data for one full period of the sinusoidal wave are all issued, data of "data end" type is issued at the last stage, and before entering the next period, designation of the front address of one period of PWM data 1, data unit timer $T_2$ and initial value next to the carrier period $T_0$ are set. When the PWM data, carrier period $T_0$ and data unit timer $T_2$ are not changed, the same data as before are repeatedly issued. When the carrier period $T_0$ and data unit timer $T_2$ are changed, the frequency f and the output voltage V are changed while retained the PWM pattern as before. When the front address of the data address is changed, the carrier N and the data number K select different PWM patterns. The front address of the data address, carrier period $T_0$ and the data unit timer $T_2$ are preliminarily determined in the main routine by comparing and computing the capability, current and value of temperature setting as the air conditioner.

Figure 21:
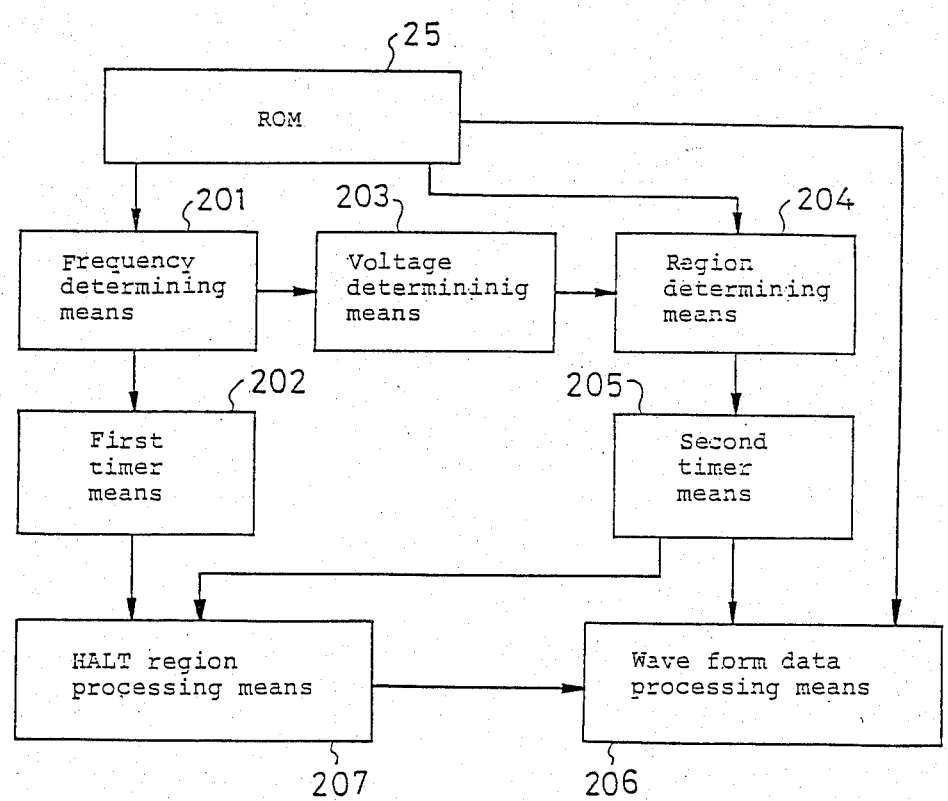
FIG. 21 is a block diagram showing the embodiment in FIG. 16 of the apparatus embodying the present invention.

FIG. 21 shows a block diagram of the embodiment of FIG. 16.

The ROM 25 memorizes the predetermined carrier number, data number and data contents. A frequency determining means 201 determines the carrier period of one period of the output wave based on the carrier number memorized in the above carrier number. The control part 26 in FIG. 16 functions as the frequency determining means 201 by the frequency setting or the output of a sensor, etc., as an external input. The first timer means 202 supplies the carrier period determined by the frequency determining means 201. The first timer means 202 (or 22 in FIG. 16) outputs according to the output of the control part 26 on the basis of the system clock output from the system clock 21. A voltage determining means 203 determines a voltage corresponding to a predetermined frequency/voltage characteristics responding to the carrier period determined by the frequency determining means 201. The control part 26 fills the role of the voltage determining means 203 according to the data of the ROM 25 via the RAM. A region determining means 204 determines a ratio of the data region and the HALT region in the carrier period so as to make the output being the voltage determined by the voltage determining means. The control part 26 fills the role of the region determining means 204.

The second timer means 25 (or 23) outputs the data unit timer of the data region determined by the region determining means 204. The second timer means (23) outputs according to the output of the control part 26 on the basis of the system clock output from the system clock 21. A waveform data processing means 206 supplies the memorized data contents in a predetermined order to the data region predetermined by the region determining means, every data unit timer being determined by the second timer means. The data contents memorized in the ROM 25 is supplied to the control part 26 and memorized in the RAM 27. A HALT region processing means 207 compares the end of the carrier period outputted by the first timer means with the end of the data unit timer outputted by the second timer means and outputs the HALT region to the waveform data processing means when the end of the data unit timer is faster than that of the carrier period. The control part 26 fills the role of the HALT region processing means by considering the outputs of the $T_0$ timer 22 and the $T_2$ timer 23.

In this way, by controlling the system as the air conditioner, the algorithm of simulated sinusoidal wave non-equal width PWM system is generated, and smooth controlling of the revolution number of the air conditioner compressor is attainable.

Industrial Utility

As has been described, according to the present invention, in the simulated sinusoidal wave non-equal PWM system, ROM area is saved, voltage-frequency pattern is obtainable only by operation of the data unit timer $T_2$ and the carrier period $T_0$ and smooth change of revolutional speed is obtainable even with utilizing digital control of HALT system and safe synchronized switching of the carrier period $T_0$ and data unit timer $T_2$, and accordingly the following drastic advantages are obtainable.

Since the carrier period $T_0$ and the data unit timer $T_2$ can be synchronizedly switched, a pattern switching of the PWM data and carrier during frequency changing process is safely operaable. Accordingly, the usable range of the revolutional speed of the electric motor become very wide and the maximum revolutional speed can be selected very high and for the wide range of the revolutional speed very good simulated sinusoidal wave is produced, thereby enabling smooth and safe adjusting of the revolutional speed of the electric motor. Besides, voltage boosting responding to change of load can be obtained only by the data unit timer $T_2$ but retaining the PWM data pattern unchanged.

Especially by controlling the system by utilizing the digital system such as central processing unit, data of the present rotation state is obtainable without special feedback or the like means, and thereby reasonable controlling as the system is attainable.

Furthermore, since the same reference frequency is utilized to produce the carrier period $T_0$ and the data unit timer $T_2$ by frequency dividing therefrom, there is no fear of inducing error between them, and therefore accurate controlling for frequency as well as voltage is attainable.

What is claimed is:

1. An inverter-drive controlling apparatus comprising:
   read only memory means for storing data including a carrier number, data number and data contents;
   frquency determining means for determining a carrier period of one portion of an output wave on the basis of said carrier number stored in said read only memory means;
   first timer means for outputting a value representing the carrier period determined by said frequency determining means;
   voltage determining means for determining a voltage corresponding to a predetermined frequency to voltage characteristic and responsive to said carrier period determined by said frequency determining means;

region determining means for determining a ratio of a data region to a HALT region in said carrier period, so that said ratio is such to obtain said voltage determined by said voltage determining means when said carrier period is pulse-width demodulated;

second timer means for outputting at least one data unit timer time period in said data region determined by said region determining means;

waveform data processing means for supplying said stored data contents in a predetermined order to said data region predetermined by said region determining means, each item of data contents being supplied during one of said data unit timer time periods determined by said second timer means; and HALT region processing means for comparing an end of said carrier period outputted by said first timer means with an end of said data unit timers outputted by said second timer means, and for outputting a signal representing the length of the HALT region, represented by the difference between said end of said data unit timers and said end of said carrier period, to said waveform data processing means, when the end of said data unit timers occurs sooner than that of said carrier period.

2. An inverter-drive controlling apparatus in accordance with claim 1, wherein said HALT region processing means outputs said data unit timers sequentially without outputting said said signal representing the length of said HALT region when the end of said carrier period occurs sooner than that of said data unit timer.

3. An inverter-drive controlling apparatus comprising:

read only memory (ROM) means for memorizing a carrier number, data number and data contents;

frequency determining means for determining a carrier period of one portion of an output wave on the basis of said carrier number memorized in said ROM means;

first timer means for outputting a value representing the carrier period determined by said frequency determining means;

voltage determining means for determining a voltage corresponding to a predetermined frequency to voltage characteristic and responsive to said carrier period determined by said frequency determining means;

region determining means for determining a ratio of a data region to a HALT region in said carrier period, so that said ratio is such to obtain said voltage determined by said voltage determining means when said carrier period is pulse-width demodulated;

second timer means for outputting at least one data unit timer time period in said data region determined by said region determining means;

waveform data processing means for supplying said memorized data contents in a predetermined order to said data region predetermined by said region determining means, each item of data contents being supplied during one of said data unit timer time periods determined by said second timer means;

HALT region processing means for comparing an end of said carrier period outputted by said first timer means with an end of said data unit timers outputted by said second timer means and for outputting a signal representing the length of the HALT region to said waveform data processing means when the end of said data unit timers occurs sooner than that of said carrier period; and at least one of said carrier and said waveform data being provided as a plural set of different data regions.

4. An inverter-drive controlling apparatus in accordance with claim 3, wherein said HALT region processing means outputs said data unit timer periods sequentially without outputting said HALT region when the end of said carrier period occurs sooner than that of said data unit timer.

5. An inverter-drive controlling apparatus comprising:

ROM means for memorizing a carrier number, data number and data contents;

frequency determining means for determining a carrier period of one portion of an output wave on the basis of said carrier number memorized in said ROM means;

first timer means for outputting the carrier period determined by the frequency determining means;

voltage determining means for determining a voltage corresponding to a predetermined frequency to voltage characteristic responsive to the carrier period determined by said frequency determining means;

region determining means for determining a ratio of a data region and a HALT region in said carrier period so that the ratio of data to HALT is such to obtain said voltage determined by said voltage determining means when integrated;

second timer means for outputting at least one data unit timer in said data region determined by said region determining means;

waveform data processing means for supplying said memorized data contents in a predetermined order to said data region predetermined by said region determining means, each data unit timer period being determined by said second timer means;

HALT region processing means for comparing the end of said carrier period outputted by said first timer means with the end of said data unit timer outputted by said second timer means and for outputting a signal representing the length of the HALT region to said waveform data processing means when the end of said data unit timer occurs sooner than that of said carrier period; and at least one of said carrier and said waveform data being provided as plural sets of different data regions, and said data regions and said first timer means and second second timer means being synchronously switched at the point of time of data end of one period of said waveform data.

6. An inverter-drive controlling apparatus in accordance with claim 5, wherein said HALT region processing means outputs said at least one data unit timers sequentially without outputting said HALT region when the end of said carrier period occurs sooner than said data unit timer.

7. An apparatus as in claim 1 wherein said first and said second timer means are synchronized with one another.

8. An apparatus as in claim 3 wherein said first and said second timer means are synchronized with one another.

9. An inverter-drive controlling apparatus comprising:

read only memory means for storing data including a carrier number, data number and data contents;

frequency determining means for determining a carrier period of one portion of an output wave on the basis of said carrier number stored in said read only memory means;

first timer means for outputting a value representing the carrier period determined by said frequency determining means;

voltage determining means for determining a voltage corresponding to a predetermined frequency to voltage characteristic responding to the carrier period determined by said frequency determining means;

region determining means for determining a ratio of a first region to a second region in said carrier period, said ratio being determined so that said voltage determined by said voltage determining means is obtained when said carrier period is demodulated as a pulse width modulated signal;

second timer means for outputting at least one data unit timer time period in said first region determined by said region determining means;

waveform data processing means for supplying said stored data contents in a predetermined order to said first region predetermined by said region determining means, each data unit timer time period being determined by said second timer means; and second region processing means for comparing the end of said carrier period outputted by said first timer means with the end of said data unit timer time period outputted by said second timer means to determine if said second region exists, and for outputting a signal representing the length of the second region to said waveform data processing means when the end of said data unit timer time period occurs sooner than that of said carrier period.

* * * * *